(12) United States Patent
Zhang et al.

(10) Patent No.: US 10,841,838 B2
(45) Date of Patent: Nov. 17, 2020

(54) COMMUNICATION METHOD AND DEVICE

(71) Applicant: CHINA ACADEMY OF TELECOMMUNICATIONS TECHNOLOGY, Beijing (CN)

(72) Inventors: Juan Zhang, Beijing (CN); Ying Wang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 16/497,432

(22) PCT Filed: Mar. 20, 2018

(86) PCT No.: PCT/CN2018/079660
§ 371 (c)(1),
(2) Date: Sep. 24, 2019

(87) PCT Pub. No.: WO2018/171588
PCT Pub. Date: Sep. 27, 2018

(65) Prior Publication Data
US 2020/0107225 A1  Apr. 2, 2020

(30) Foreign Application Priority Data

Mar. 24, 2017 (CN) .......................... 2017 1 0184842

(51) Int. Cl.
*G01R 31/08* (2020.01)
*G06F 11/00* (2006.01)
(Continued)

(52) U.S. Cl.
CPC ..... *H04W 28/085* (2013.01); *H04W 28/0268* (2013.01); *H04W 48/20* (2013.01); *H04W 80/10* (2013.01)

(58) Field of Classification Search
CPC .......... H04W 28/085; H04W 20/0268; H04W 48/20; H04W 80/10; H04W 76/15;
(Continued)

(56) References Cited

U.S. PATENT DOCUMENTS

2010/0035626 A1* 2/2010 Iwamoto ............... H04W 28/18
455/452.1
2015/0271836 A1* 9/2015 Damnjanovic ... H04W 72/0413
370/329
(Continued)

FOREIGN PATENT DOCUMENTS

| CN | 102883440 A | 1/2013 |
|---|---|---|
| CN | 103731811 A | 4/2014 |
| CN | 106211244 A | 12/2016 |

OTHER PUBLICATIONS

Office action for Japanese Patent Application No. 2019-552490 (Sep. 2020)—downloaded from Global Dossier website (9 pages).*
(Continued)

*Primary Examiner* — Stephen M D Agosta
(74) *Attorney, Agent, or Firm* — Kilpatrick Towsend & Stockton, LLP

(57) ABSTRACT

Disclosed by the present invention are a communication method and device, wherein the method comprises: a first user plane function (UPF) network element establishing a secondary user plane channel to a secondary radio access network (RAN) network element; the first UPF network element receiving downlink data sent by a data network, and from within said downlink data, sending downlink data that requires distribution to the secondary user plane channel on the basis of data flow information to be distributed, wherein the data flow information to be distributed is stored in the first UPF network element so as to carry out the distribution of data in a 5G system, thus increasing the utilization of
(Continued)

radio resources, reducing the delay in switching systems and improving user and system performances.

7 Claims, 5 Drawing Sheets

(51) Int. Cl.
| | | |
|---|---|---|
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04W 28/08* | (2009.01) | |
| *H04W 28/02* | (2009.01) | |
| *H04W 48/20* | (2009.01) | |
| *H04W 80/10* | (2009.01) | |

(58) Field of Classification Search
CPC ...... H04W 88/06; H04W 76/27; H04L 12/42; H04L 12/44; H04L 12/46; H04L 12/463; H04B 7/0413; H04B 7/0417; H04B 7/0452; H04B 7/0465; H03M 13/118; H03M 13/1197; H03M 13/616; H03M 13/6325; G06F 2009/45595; G06F 9/45558
See application file for complete search history.

(56) References Cited

U.S. PATENT DOCUMENTS

| | | | |
|---|---|---|---|
| 2015/0358179 A1 | 12/2015 | Toillon et al. | |
| 2016/0057800 A1* | 2/2016 | Ingale ............... | H04W 56/0005 370/216 |
| 2017/0171768 A1* | 6/2017 | Kim ..................... | H04L 5/001 |
| 2018/0132150 A1* | 5/2018 | Du ....................... | H04W 36/08 |

OTHER PUBLICATIONS

InterDigital, "Update to 6.5.2 'Enabling (re)selection of efficient user plane paths'", SA WG2 Meeting #117, S2-165547, Oct. 17-21, 2016, Kaohsiung, TW.
InterDigital, "Update to 6.5.2 'Enabling (re)selection of efficient user plane paths'", SA WG2 Meeting #117, S2-166235, Oct. 17-21, 2016, Kaohsiung, TW.
MediaTek Inc., Replacing "5G-(R)AN" by "NG-(R)AN", 3GPP TSG-SA WG2 Meeting #120, S2-171896, Susan, Korea, Mar. 27-Apr. 3, 2017.
CATT, Update PDU session anchor relocation for SSC mode 3 with multiple PDU sessions, 3GPP TSG SA WG2 Meeting #120, S2-172137, Mar. 27-31, 2017, Busan, Korea.
ZTE, TS 23.502 update on Multi homed PDU session, SA WG2 Meeting #120, S2-172206, Mar. 27-31, 2017, Busan, Korea.
NTT Docomo, Procedures for Dual Connectivity, SA WG2 Meeting #120, S2-172246, Mar. 27-31, 2017, Busan, South Korea.
Samsung, "23.502: Update of PDU session anchor change for IPv8multi-horned session", SA WG2 Meeting#120, Mar. 27-31, 2017, Busan, South Korea, total 13 pages, S2-172125.

\* cited by examiner

COMMUNICATION METHOD AND DEVICE

This application is a National Stage of International Application No. PCT/CN2018/079660, filed Mar. 20, 2018, which claims priority to Chinese Patent Application No. 201710184842.0, filed Mar. 24, 2017, both of which are hereby incorporated by reference in their entireties.

FIELD

The present invention relates to the field of communications, and particularly to a communication method and device.

BACKGROUND

In a heterogeneous radio system in which different categories of base stations interoperate with each other, a bandwidth resource and a coverage area of each base station are so limited that a subscriber is served by aggregating radio resources of a plurality of cells or base stations to thereby make it easier to satisfy a capacity demand and a coverage demand of the subscriber, and this is generally referred to as multi-connectivity. In a Long Term Evolution (LTE) system, common multi-connectivity modes include carrier aggregation, Coordinated Multi-Point (CoMP) transmission, dual-connectivity, etc.

Here in the dual-connectivity solution of the LTE system, a data-plane radio bearer can be served by a Master eNodeB (MeNB) or a Secondary eNodeB (SeNB) alone, or can be served by both the MeNB and the SeNB. When the bearer is served by the MeNB alone, it may be referred to as a Master Cell Group (MCG) bearer (i.e., a serving cell group controlled by the MeNB). When the bearer is served by the SeNB alone, it may be referred to as a Secondary Cell Group (SCG) bearer (i.e., a serving cell group controlled by the SeNB). When the bearer is served by both the MeNB and the SeNB, it may be referred to as a split bearer.

In the architecture serving the split bearer, a core network in the LTE system manages and transmits user-plane data at the granularity of a bearer. The MeNB transmits a part of the data to the SeNB, which further issues the data to a user equipment, so that the data are offloaded. In a 5G system, a core network manages and transmits user-plane data at the granularity of a Packet Data Unit (PDU) session connection, and a user-plane channel between a user-plane node in the core network, and a Radio Access Network (RAN) element is set up at the granularity of a PDU session connection instead of the granularity of a bearer. Accordingly there has been absent so far a solution to offloading data in the 5G system.

SUMMARY

Embodiments of the invention provide a communication method and device so as to offload data in a 5G system to thereby improve the utilization ratio of radio resources, shorten a system handover delay, and improve the experience of a subscriber, and the system performance.

In a first aspect, an embodiment of the invention provides a communication method including: setting up, by a first User-Plane Function (UPF) network element, a secondary user-plane channel to a secondary Radio Access Network (RAN) network element; and receiving, by the first UPF network element, downlink data over a data network, and transmitting downlink data to be offloaded, to the secondary user-plane channel according to data-stream-to-be-offloaded information stored in the first UPF network element.

In a second aspect, an embodiment of the invention provides a communication method at the SMF side, the method including: receiving, by a Session Management Function (SMF) network element, a request message sent by a primary Radio Access Network (RAN) network element for setting up a user-plane channel, where the request message includes a channel identifier of a secondary RAN network element; sending, by the SMF network element, the request message to a first User-Plane Function (UPF) network element and a second UPF network element in a UPF network element group respectively, and receiving response messages to the request, sent by the first UPF network element and the second UPF network element, where the response message to the request, sent by the first UPF network element includes channel information of a secondary user-plane channel which is set up between the first UPF network element and the secondary RAN network element, and the response message to the request, sent by the second UPF network element includes channel information of a secondary user-plane channel which is set up between the second UPF network element and the first UPF network element; and sending, by the SMF network element, the response messages to the request to the primary RAN network element.

In a third aspect, an embodiment of the invention provides a communication method at the RAN side, the method including: sending, by a primary Radio Access Network (RAN) network element, a request message to a Session Management Function (SMF) network element for setting up a user-plane channel, where the request message includes channel information of a secondary RAN network element; receiving, by the primary RAN network element, a response message to the request, sent by the SMF network element, where the response message to the request includes channel information of a secondary user-plane channel which is set up between a first UPF network element in a UPF network element group, and the secondary RAN network element, and the first UPF network element is an IP anchor device in a Packet Data Unit (PDU) session connection; and sending, by the primary RAN network element, a response message to the request to the secondary RAN network element.

In a fourth aspect, an embodiment of the invention provides a UPF network element including: a processor and a memory, wherein the processor is configured to read and execute program in the memory to perform the method according to the first aspect above.

In a fifth aspect, an embodiment of the invention provides an SMF network element including: a processor and a memory, wherein the processor is configured to read and execute program in the memory to perform the method according to the second aspect above.

In a sixth aspect, an embodiment of the invention provides an RAN network element including: a processor and a memory, wherein the processor is configured to read and execute program in the memory to perform the method according to the third aspect above.

In a seventh aspect, an embodiment of the invention provides a computer non-transitory readable storage medium storing computer executable instructions configured to cause the computer to perform the method according to the first aspect above.

In an eighth aspect, an embodiment of the invention provides a computer non-transitory readable storage medium storing computer executable instructions configured to cause the computer to perform the method according to the second aspect above.

In a ninth aspect, an embodiment of the invention provides a computer non-transitory readable storage medium storing computer executable instructions configured to cause the computer to perform the method according to the third aspect above.

In the embodiments of the invention, a secondary user-plane channel for offloading data is set up through a UPF network element, where the secondary user-plane channel for offloading data is generally a secondary user-plane channel which is set up to the UPF network element through a secondary RAN network element according to information about the secondary RAN network element in a request message sent by a primary RAN network element; and a base station in the secondary RAN network element can be of an LTE system, and a base station in the primary RAN network element can be of a 5G system, so that the utilization ratio of radio resources can be improved, a system handover delay can be shortened, and the experience of a subscriber, and the system performance can be improved, using the technology of dual-connectivity between the LTE system and the 5G system.

BRIEF DESCRIPTION OF THE DRAWINGS

In order to make the technical solutions according to the embodiments of the invention more apparent, the drawings to which reference is to be made in the description of the embodiments will be introduced below in brevity, and apparently the embodiments to be described below are only some embodiments of the invention. Those ordinarily skilled in the art can further derive the other drawings from these drawings without any inventive effort.

DETAILED DESCRIPTION OF THE EMBODIMENTS

In order to make the objects, technical solutions, and advantages of the embodiments of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

It shall be appreciated that the technical solutions according to the embodiments of the invention are applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced long term evolution (LTE-A) system, a Universal Mobile Telecommunication System (UMTS), an evolved Long Term Evolution (eLTE) system, a 5G (e.g., NR) system, and other mobile communication systems.

It shall be further appreciated that in the embodiments of the invention, a terminal or referred to as a user equipment is a device providing a user with voice and/or data connectivity, e.g., a handheld device, a vehicular device, etc., with a radio connectivity function. For example, common terminals include a mobile phone, a tablet computer, a notebook computer, a palm computer, a Mobile Internet Device (MID), a wearable device, e.g., a smart watch, a smart wrist ring, a pedometer, etc.

Figure 1:
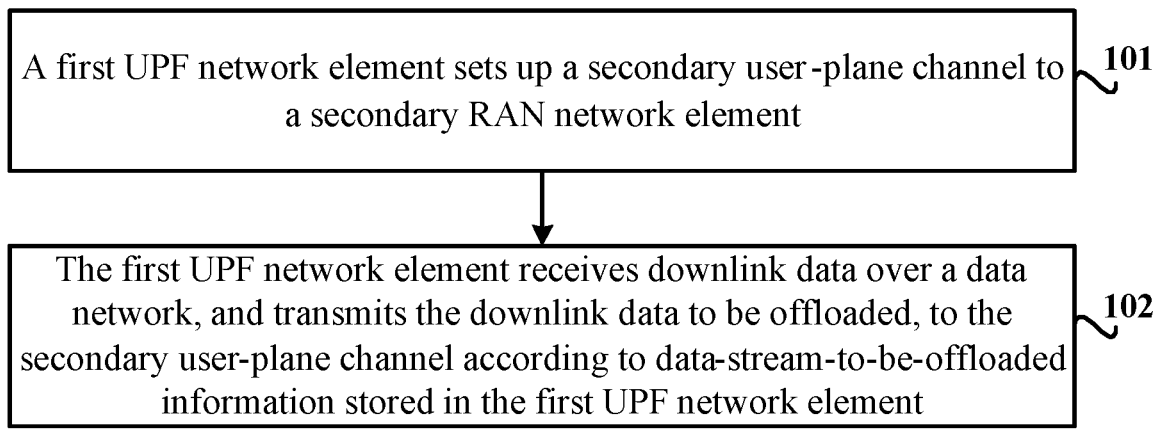
FIG. 1 is a schematic flow chart of a communication method according to an embodiment of the invention.

Based upon the description above, FIG. 1 illustrates a schematic flow chart of a communication method according to an embodiment of the invention. The method includes the following operations.

In the operation 101, a first UPF network element sets up a secondary user-plane channel to a secondary RAN network element.

In the operation 102, the first UPF network element receives downlink data over a data network, and transmits the downlink data to be offloaded, to the secondary user-plane channel according to data-stream-to-be-offloaded information stored in the first UPF network element.

It shall be noted that in a next-generation radio communication system, e.g., a New Radio (NR) system, a user equipment sets up a Packet Data Unit (PDU) session with a Data Network (DN) network element through a User-Plane Function (UPF) network element. The PDU session provides a PDU connection service between the user equipment and the DN network element.

Figure 2:
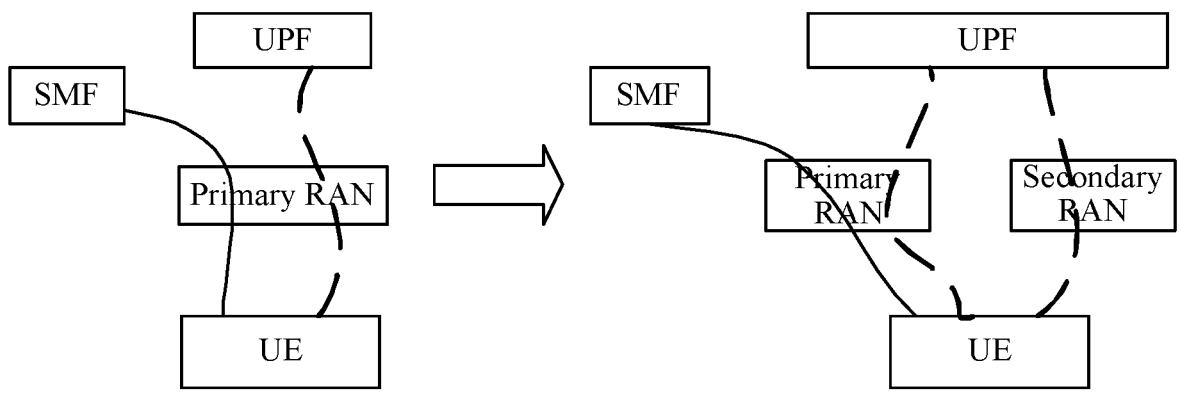
FIG. 2 is a schematic diagram of a dual-connectivity architecture of a 5G system according to an embodiment of the invention.

A system as illustrated in FIG. 2 includes a Session Management Function (SMF) network element, a Radio Access Network (RAN) network element (referred to as an Access Network (AN) network element), a UPF network element, etc. The RAN network element includes a base station and a radio network controller, and generally functions to control a user equipment to access a mobile communication network wirelessly. The SMF network element is responsible for session management, allocating and managing an Internet Protocol (IP) address of the user equipment, allocating and selecting an anchor function of the UPF network element, (re)selecting a path between the UPF network element and the user plane, etc. The UPF network element is a user-plane function device responsible for routing and forwarding a data packet, legal listening, buffering a downlink data packet, triggering a downlink data packet notification message, and other functions. When the UPF network element receives a downlink data packet of the user equipment, or the UPF network element or another core-network device triggers a control signaling procedure, the UPF network element determines a PDU session identifier of a PDU session including the downlink data packet or the control signaling. Upon determining the PDU session identifier according to the received downlink data packet of the user equipment, the UPF network element sends a data notification message including the PDU session identifier to the SMF network element to instruct a network device (e.g., the SMF network element) to page the user equipment so as to transmit the downlink data packet to the user equipment.

Stated otherwise, the data are offloaded through the primary and secondary RAN network elements in the communication method as illustrated in FIG. 1. As illustrated in FIG. 2, the user equipment accesses the primary RAN network element; the primary RAN network element interacts with the user equipment via a control-plane message; and the primary RAN network element selects and migrates a part or all of data stream bearers to the secondary RAN network element, so that the primary network element can request the UPF network element for setting up the secondary user-plane channel between the secondary RAN network element and the UPF network element to thereby offload the data. Stated otherwise, upon deciding to offload some data stream to the secondary RAN network element, the primary RAN network element sends the data-stream-to-be-offloaded information to the SMF network element. The data-stream-to-be-offloaded information is stream identification information, Quality of Service (QoS) information, or Internet Protocol (IP) quintuple information, etc. The SMF network element further sends the data-stream-to-be-offloaded information to the UPF network element to request the UPF network element for setting up a new user-plane channel for the data stream to be offladed, so that the UPF network element can offload the received downlink data to the different user-plane channel.

There may be a number of possible architectures in the 5G network architecture being discussed, for example, there is a UPF network element between the RAN network element and the DN network, or there are two or more UPF network elements between the RAN network element and the DN network. These two architectures will be described in the embodiments of the invention.

First Scenario.

Figure 3:
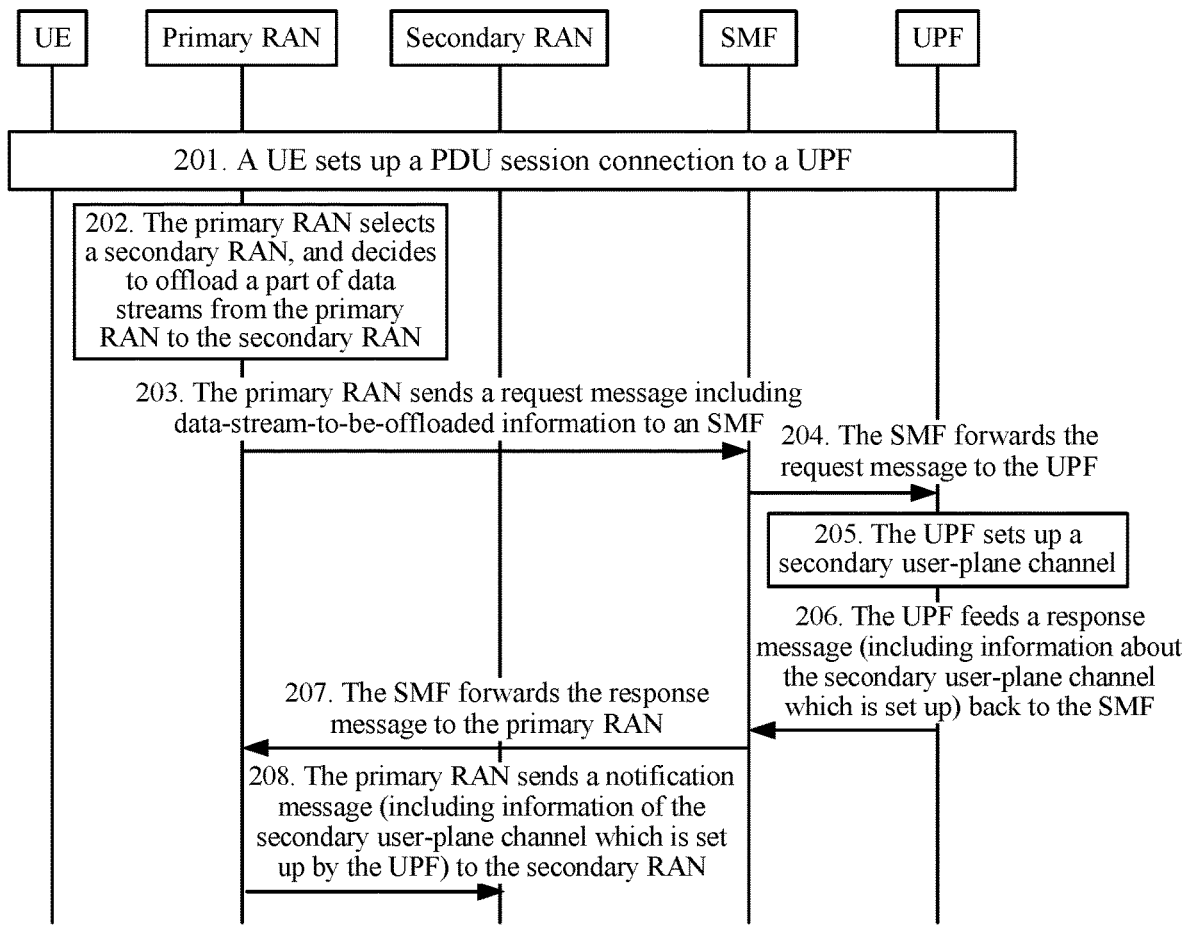
FIG. 3 is a schematic diagram of interaction in a system including a UPF network element according to an embodiment of the invention.

FIG. 3 illustrates the architecture in which there is only one UPF network element in a PDU session connection. In this architecture, a particular offloading process is as follows.

In the operation 201, a UE sets up a PDU session connection to a UPF network element through a primary RAN network element.

In the operation 202, the primary RAN network element selects a secondary RAN network element, and decides to offload a part of data streams of this PDU session connection to the secondary RAN network element.

In the operation 203, the primary RAN network element sends a request message to an SMF network element for setting up a user-plane channel, where the request message generally requests for setting up a user-plane channel between the UPF network element and the secondary RAN network element. The request message carries channel information of the secondary RAN network element side. The channel information refers to the address of the secondary RAN network element, and data-stream-to-be-offloaded information. The data-stream-to-be-offloaded information includes data stream IDs, QoS information, or IP quintuple information, etc.

In the operation 204, the SMF network element initiates a user plane setup request to the UPF network element to request the UPF network element for setting up a new user-plane channel to the secondary RAN network element for the data streams to be offloaded. The user plane setup request message includes channel information of the secondary RAN network element side (secondary user-plane channel information), and the data-stream-to-be-offloaded information, where the channel information of the secondary RAN network element side (secondary user-plane channel information) includes the address of the UPF network element, and the address of the secondary RAN network element.

In the operation 205, the UPF network element stores the data-stream-to-be-offloaded information, and sets up a new secondary user-plane channel to the secondary RAN network element, and upon reception of downlink data of a user equipment, the UPF network element decides to map the downlink data, in the PDU session, indicated by the data-stream-to-be-offloaded information to the secondary user-plane channel for transmission, according to the stored data-stream-to-be-offloaded information.

In the operation 206, the UPF network element returns to the SMF network element a response message to the request that the secondary user-plane channel is set up.

In the operation 207, the SMF network element returns a response message to the primary RAN network element, where the response message includes identification information of the user-plane channel of the UPF network element to the secondary RAN network element, i.e., the UPF address of the secondary user-plane channel, and the address of the secondary RAN network element.

In the operation 208, the primary RAN network element sends channel identification information of the UPF network element side to the secondary RAN network element.

Second Scenario.

Figure 4:
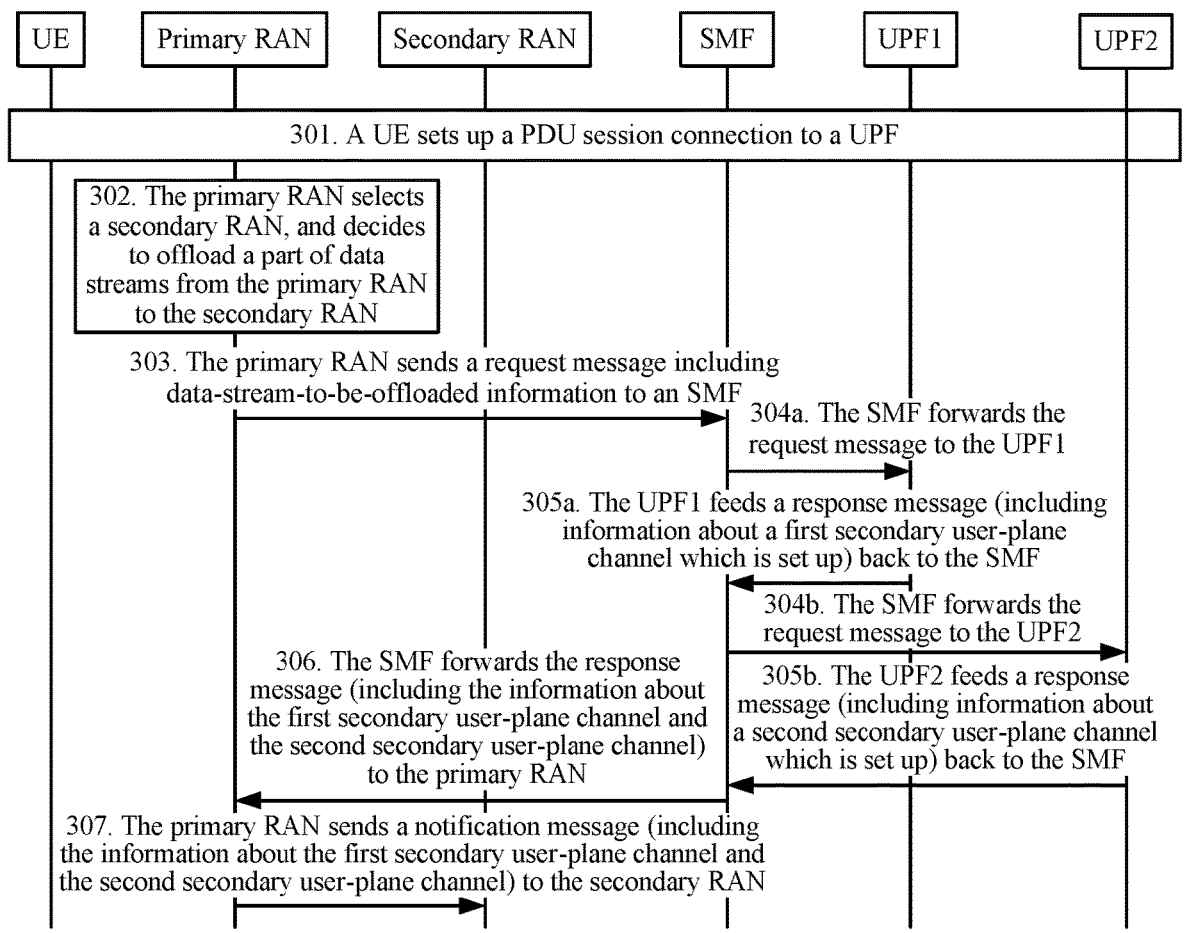
FIG. 4 is a schematic diagram of interaction in a system including a plurality of UPF network elements according to an embodiment of the invention.

FIG. 4 illustrates the architecture in which there are two UPF network elements in a PDU session connection. In this architecture, a particular process of offloading downlink data is as follows.

In the operation 301, a UE sets up a PDU session connection in which there are two UPF network elements (i.e. a UPF 1 and a UPF 2), where the network element UPF 2 is an IP anchor device, and the network element UPF 1 is an intermediate user-plane anchor device.

In the operation 302, a primary RAN network element selects a secondary RAN network element, and decides to offload a part of data streams of this PDU session connection to the secondary RAN network element.

In the operation 303, the primary RAN network element sends a request message to an SMF network element for setting up user-plane channels between the UPF network elements and the secondary RAN network element. The request message carries channel information of the secondary RAN network element side, and data-stream-to-be-offloaded information. The data-stream-to-be-offloaded information includes data stream IDs, QoS information, or IP quintuple information, etc.

In the operation 304*a*, the SMF network element initiates a first request message to the network element UPF 1 for setting up a user-plane channel to request the network element UPF 1 for setting up a secondary user-plane channel from the UPF 1 to the secondary RAN network element for the data streams to be offloaded, where the first request message includes the channel information of the secondary RAN network element side (information about a first secondary user-plane channel), i.e., the address of the secondary RAN network element.

In the operation 305a, the network element UPF 1 sets up a secondary user-plane channel from the UPF 1 to the secondary RAN network element, and returns a response message to the request.

In the operation 304b, the SMF network element initiates a second request message to the network element UPF 2 for setting up a user-plane channel to request the network element UPF 2 for setting up a user-plane channel from the UPF 1 to the network element UPF 2 for the data streams to be offloaded; and the SMF network element sends the data-stream-to-be-offloaded information to the network element UPF 2 for storage, and upon reception of downlink data of a user equipment, the network element UPF 2 decides to map the downlink data, in the PDU session, indicated by the data-stream-to-be-offloaded information to the user-plane channel for transmission, according to the stored data-stream-to-be-offloaded information.

In the operation 305b, the network element UPF 2 returns a response message to the SMF network element after setting up the secondary user-plane channel from the network element UPF 1 to the network element UPF 2.

In the operation 306, the SMF network element returns the response messages sent by the UPF 1 and the UPF 2 to the primary RAN network element, where the response message include channel information of the user-plane channel from the network element UPF 1 to the secondary RAN network element, and channel information of the secondary user-plane channel from the network element UPF 1 to the network element UPF 2.

In the operation 307, the primary RAN network element sends the channel information of the UPF 1 and UPF 2 sides to the secondary RAN network element.

In summary, if there is only one UPF network element, the secondary user-plane channel information relates to the user-plane channel from the UPF network element to the secondary RAN network element; and if there are a plurality of UPF network elements, the secondary user-plane channel information will relate to the user-plane channel from the UPF network element acting as an IP anchor device to the UPF network element acting as an intermediate user-plane anchor device, and the user-plane channel from the UPF network element acting as the intermediate user-plane anchor device to the secondary RAN network element.

Figure 5:
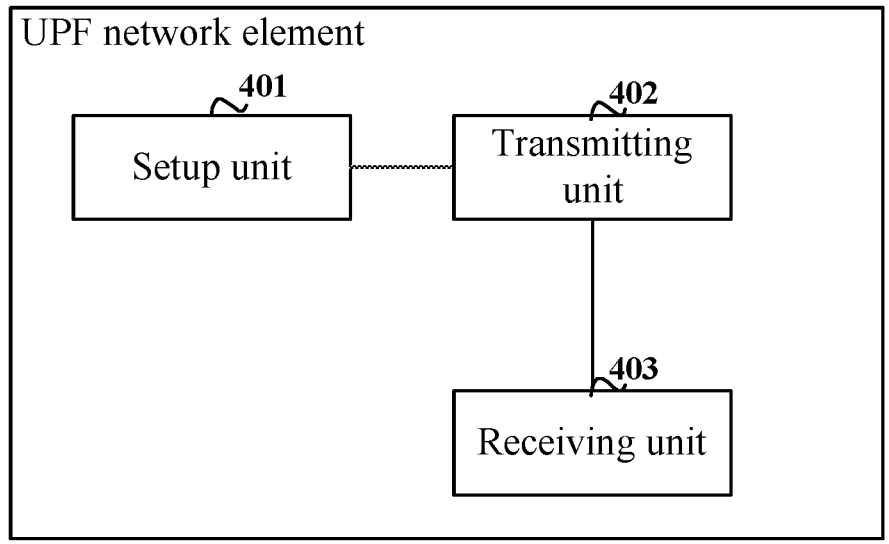
FIG. 5 is a schematic architectural diagram of a UPF network element according to an embodiment of the invention.

Based upon the same inventive idea, an embodiment of the invention further provides a UPF network element (referred hereinafter to a first UPF network element) for performing the method at the first UPF side according to the embodiment above of the invention, and as illustrated in FIG. 5, the UPF network element includes: a setup unit 401 and a transmitting unit 402. The setup unit 401 is configured to set up a secondary user-plane channel to a secondary RAN network element. The transmitting unit 402 is configured to receive downlink data over a data network, and to transmit downlink data to be offloaded, to the secondary user-plane channel according to data-stream-to-be-offloaded information stored in the first UPF network element.

Furthermore the UPF network element further includes: a receiving unit 403 configured to receive a request message sent by an SMF network element for setting up a user-plane channel. The request message includes a request for setting up a secondary user-plane channel, and the data-stream-to-be-offloaded information. The setup unit 401 is configured to set up the secondary user-plane channel between the first UPF network element and the secondary RAN network element according to the identifier of the secondary user-plane channel.

In an implementation, the receiving unit is configured, before the setup unit sets up the secondary user-plane channel to the secondary RAN network element, to receive a first request message sent by the SMF network unit for setting up a user-plane channel. The first request message includes information about a first secondary user-plane channel, and the data-stream-to-be-offloaded information. The first secondary user-plane channel is a user-plane channel of the first UPF network element to the secondary RAN network element. The setup unit is configured to set up the secondary user-plane channel between the first UPF network element and the secondary RAN network element according to the information about the first secondary user-plane channel.

Furthermore the transmitting unit 402 is further configured to send a response message to the request to the SMF network element.

Furthermore the setup unit 401 is configured to set up the secondary user-plane channel to the secondary RAN network element through N number of second UPF network elements which are user-plane anchor devices in a Packet Data Unit (PDU) session, where N is equal to 1 or more than 1.

Furthermore the data-stream-to-be-offloaded information includes at least one of stream identifiers, Quality of Service (QoS) information, or Internet Protocol (IP) quintuple information.

Based upon the same inventive idea, an embodiment of the invention further provides a UPF network element (referred hereinafter to as a second UPF network element) for performing the method at the second UPF side according to the embodiment above of the invention. The second UPF network element is a user-plane anchor device in a PDU session connection, and there is a UPF network element acting as an IP anchor device in the PDU session connection. The second UPF network element acting as the user-plane anchor device includes: a receiving unit configured to receive a request message sent by an SMF network element for setting up a user-plane channel, where the request message includes information about a secondary user-plane channel, and data-stream-to-be-offloaded information, and the secondary user-plane channel is a user-plane channel of the UPF network element acting as the user-plane anchor device to the UPF network element acting as the IP anchor device; and a setup unit configured to set up the secondary user-plane channel between the UPF network element acting as the user-plane anchor device to the UPF network element acting as the IP anchor device, according to the information about the secondary user-plane channel.

Figure 6:
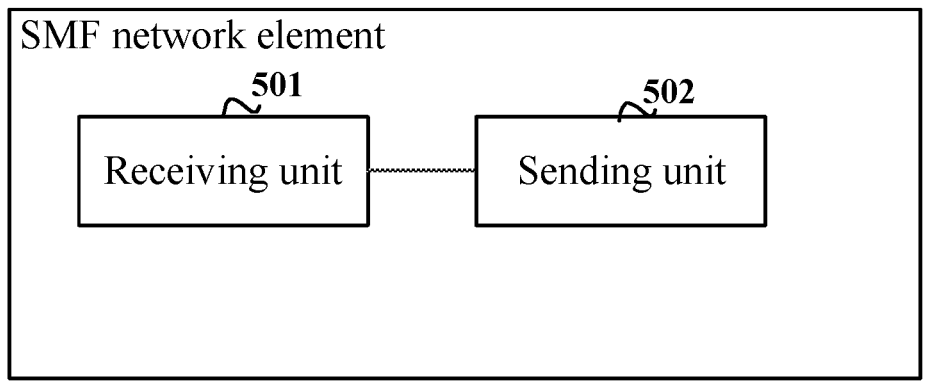
FIG. 6 is a schematic architectural diagram of an SMF network element according to an embodiment of the invention.

Based upon the same inventive idea, an embodiment of the invention further provides an SMF network element for perform the method at the SMF side according to the embodiment above of the invention, and as illustrated in FIG. 6, the SMF network element includes: a receiving unit 501 and a sending unit 502. The receiving unit 501 is configured to receive a request message sent by a primary Radio Access Network (RAN) network element for setting up a user-plane channel, where the request message includes a channel identifier of a secondary RAN network element; the sending unit 502 is configured to send the request message to a User-Plane Function (UPF) network element; the receiving unit 501 is configured to receive a response message to the request, sent by the UPF network element, where the response message to the request includes channel information of secondary user-plane channels which are set up between a group of UPF network elements and the secondary RAN network element; and the sending unit 502 is further configured to send the response message to the request to the primary RAN network element.

Here the group of UPF network elements includes a first UPF network element, and the response message to the request includes the channel information of the secondary user-plane channel which is set up between the first UPF network element and the secondary RAN network element, where the first UPF network element is an IP anchor device in the PDU session connection.

Furthermore the UPF network element group includes a first UPF network element and N number of second UPF network elements. The response message to the request further includes: channel information of secondary user-plane channels which are set up between the first UPF network element and the N number of second UPF network elements, and channel information of a secondary user-plane channel which is set up between the second UPF network element in the shortest route to the secondary RAN network element, where N is equal to 1 or more than 1, and the second UPF network elements are user-plane anchor devices in the PDU session connection.

Figure 7:
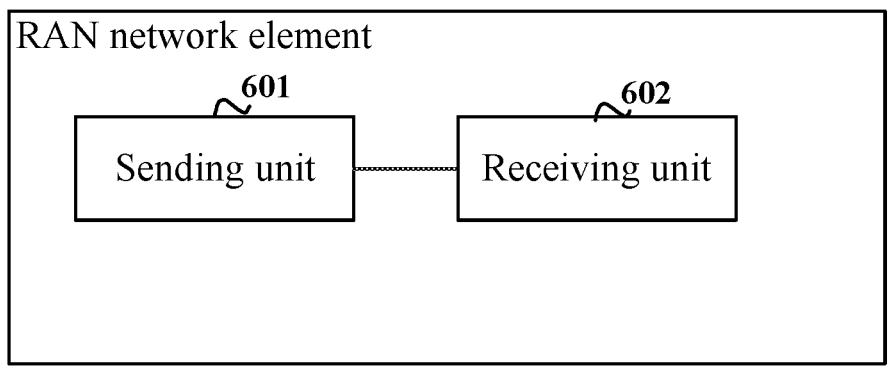
FIG. 7 is a schematic architectural diagram of an RAN network element according to an embodiment of the invention.

Based upon the same inventive idea, an embodiment of the invention further provides an RAN network element for performing the method at the RAN side according to the embodiment above of the invention, and as illustrated in FIG. 7, the RAN network element includes: a sending unit 601 and a receiving unit 602, where the sending unit 601 is configured to send a request message to an SMF network element for setting up a user-plane channel, where the request message includes a channel identifier of a secondary RAN network element; the receiving unit 602 is configured to receive a response message to the request, sent by the SMF network element, where the response message to the request includes channel information of secondary user-plane channels which are set up between a UPF network element group and the secondary RAN network element; and the sending unit 601 is further configured to send the response message to the request to the secondary RAN network element.

Here the UPF network element group includes a first UPF network element, and the response message to the request includes the channel information of the user-plane channel which is set up between the first UPF network element and the secondary RAN network element, where the first UPF network element is an IP anchor device in the PDU session connection.

Furthermore the UPF network element group includes a first UPF network element and N number of second UPF network elements, and the response message to the request further includes: channel information of secondary user-plane channels which are set up between the first UPF network element and the N number of second UPF network elements, and channel information of a secondary user-plane channel which is set up between the second UPF network element in the shortest route to the secondary RAN network element, where N is equal to 1 or more than 1, and the second UPF network elements are user-plane anchor devices in the PDU session connection.

Figure 8:
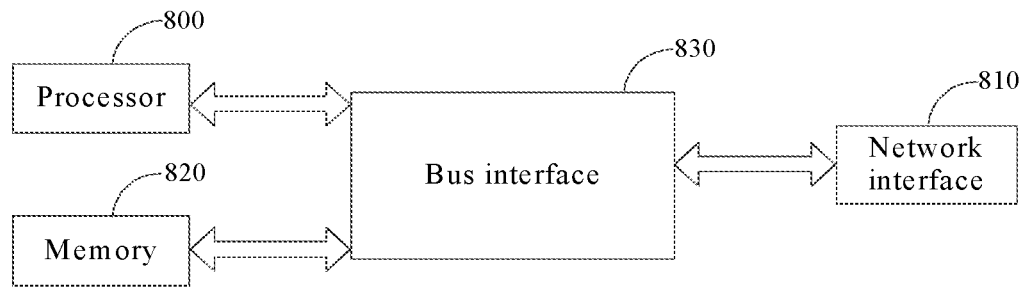
FIG. 8 is a schematic structural diagram of a UPF network element according to another embodiment of the invention.

Based upon the same technical idea, an embodiment of the invention further provides a UPF network element which can perform the functions at the first UPF network element side according to the embodiment above of the invention. As illustrated in FIG. 8, the UPF network element includes a network interface 810 and at least one processor 800 connected with the network interface. Optionally the processor 800 is a central processing unit (CPU), an Application Specific Integrated Circuit (ASIC), a Field Programmable Gate Array (FPGA), or a Complex Programmable Logic Device (CPLD).

Here the processor 800 is configured to read and execute program in a memory 820: to set up a secondary user-plane channel to a secondary RAN network element; and to receive downlink data over a data network, and to transmit downlink data to be offloaded, to the secondary user-plane channel according to data-stream-to-be-offloaded information stored in the UPF network element. Reference can be made to the related description in the embodiment above for details thereof, so a repeated description thereof will be omitted here.

Here in FIG. 8, the bus architecture includes any number of interconnecting buses and bridges to particularly link together various circuits including one or more processors represented by the processor 800, and one or more memories represented by the memory 820. The bus architecture further links together various other circuits, e.g., a peripheral device, a manostat, a power management circuit, etc., all of which are well known in the art, so a further description thereof will be omitted in this context. The bus interface 830 serves as an interface. The network interface 810 can be a number of elements, e.g., a transmitter and a receiver, which are units for communication with various other devices over a transmission medium. The processor 800 is responsible for managing the bus architecture and performing normal processes, and can further provide various functions including timing, a peripheral interface, voltage regulation, power management, and other control functions. The memory 820 can store data for use by the processor 800 in performing the operations.

Figure 9:
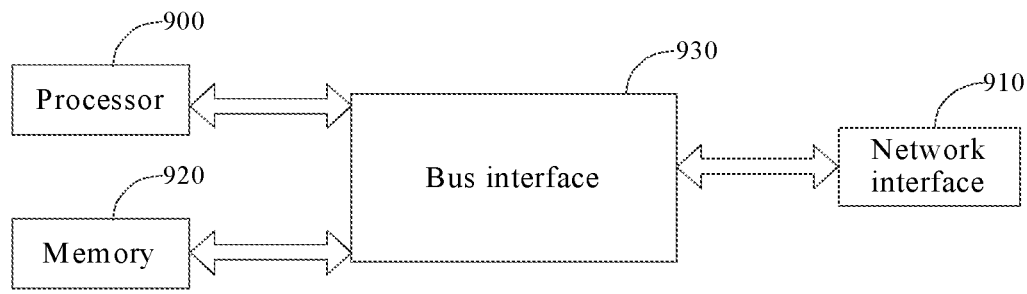
FIG. 9 is a schematic structural diagram of a UPF network element according to another n embodiment of the invention.

Based upon the same technical idea, an embodiment of the invention further provides a UPF network element which can perform the functions at the second UPF network element side according to the embodiment above of the invention. As illustrated in FIG. 9, the UPF network element includes a network interface 910 and at least one processor 900 connected with the network interface, and optionally the processor 900 is a CPU, an ASIC, an FPGA, or a CPLD.

Here the processor 900 is configured to read and execute program in a memory 920: to receive a request message sent by an SMF network element for setting up a user-plane channel, where the request message includes information about a secondary user-plane channel, and data-stream-to-be-offloaded information, and the secondary user-plane channel is a user-plane channel of the UPF network element acting as the user-plane anchor device to the UPF network element acting as the IP anchor device; and to set up the secondary user-plane channel between the UPF network element acting as the user-plane anchor device to the UPF network element acting as the IP anchor device, according to the information about the secondary user-plane channel. Reference can be made to the related description in the embodiment above for details thereof, so a repeated description thereof will be omitted here.

Here in FIG. 9, the bus architecture includes any number of interconnecting buses and bridges to particularly link together various circuits including one or more processors represented by the processor 900, and one or more memories represented by the memory 920. The bus architecture further links together various other circuits, e.g., a peripheral device, a manostat, a power management circuit, etc., all of which are well known in the art, so a further description thereof will be omitted in this context. The bus interface 930 serves as an interface. The network interface 910 can be a number of elements, e.g., a transmitter and a receiver, which are units for communication with various other devices over a transmission medium. The processor 900 is responsible for managing the bus architecture and performing normal processes, and can further provide various functions including timing, a peripheral interface, voltage regulation, power management, and other control functions. The memory 920 can store data for use by the processor 900 in performing the operations.

Figure 10:
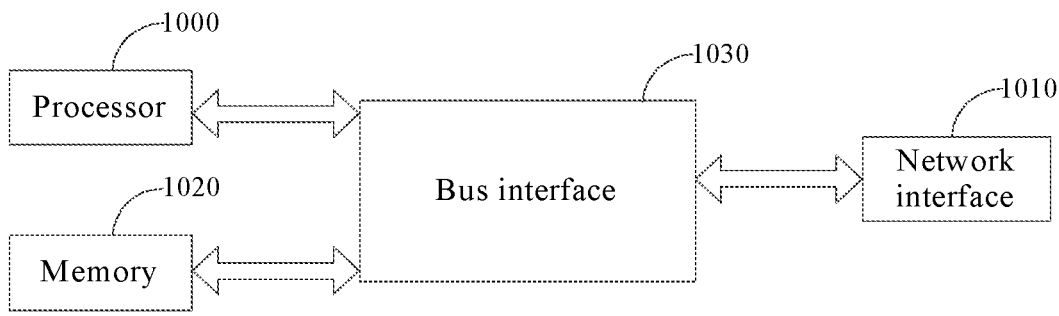
FIG. 10 is a schematic structural diagram of an SMF network element according to another embodiment of the invention.

Based upon the same technical idea, an embodiment of the invention further provides an SMF network element which performs the functions at the SMF network element side according to the embodiment above of the invention. As illustrated in FIG. 10, the SMF network element includes a network interface 1010 and at least one processor 1000 connected with the network interface, and optionally the processor 1000 is a CPU, an ASIC, an FPGA, or a CPLD.

Here the processor 1000 is configured to read and execute program in a memory 1020: to receive a request message sent by a primary RAN network element for setting up a user-plane channel, where the request message includes a channel identifier of a secondary RAN network element; to send the request message to a first UPF network element and a second UPF network element in a UPF network element group respectively; to receive response messages to the request, sent by the first UPF network element and the second UPF network element, where the response messages to the request include channel information of secondary user-plane channels which are set up between the UPF network elements and the secondary RAN network elements, where the response message to the request, sent by the first UPF network element includes the channel information of the secondary user-plane channel which is set up between the first UPF network element and the secondary RAN network element, and the response message to the request, sent by the second UPF network element includes the channel information of the secondary user-plane channel which is set up between the second UPF network element and the first UPF network element; and to send the response messages to the request to the primary RAN network element. Reference can be made to the related description in the embodiment above for details thereof, so a repeated description thereof will be omitted here.

Here in FIG. 10, the bus architecture includes any number of interconnecting buses and bridges to particularly link together various circuits including one or more processors represented by the processor 1000, and one or more memories represented by the memory 1020. The bus architecture further links together various other circuits, e.g., a peripheral device, a manostat, a power management circuit, etc., all of which are well known in the art, so a further description thereof will be omitted in this context. The bus interface 1030 serves as an interface. The network interface 1010 can be a number of elements, e.g., a transmitter and a receiver, which are units for communication with various other devices over a transmission medium. The processor 1000 is responsible for managing the bus architecture and performing normal processes, and can further provide various functions including timing, a peripheral interface, voltage regulation, power management, and other control functions. The memory 1020 can store data for use by the processor 1000 in performing the operations.

Figure 11:
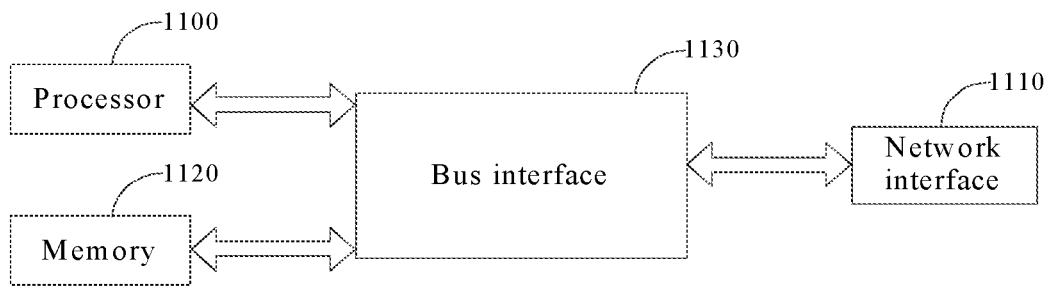
FIG. 11 is a schematic structural diagram of an RAN network element according to another embodiment of the invention.

Based upon the same technical idea, an embodiment of the invention further provides an RAN network element which can perform the functions at the primary RAN network element side according to the embodiment above of the invention. As illustrated in FIG. 11, the RAN network element includes a network interface 1110 and at least one processor 1100 connected with the network interface, and optionally the processor 1100 is a CPU, an ASIC, an FPGA, or a CPLD.

Here the processor 1100 is configured to read and execute program in a memory 1120: to send a request message to an SMF network element for setting up a user-plane channel, where the request message includes a channel identifier of a secondary RAN network element; to receive a response message to the request, sent by the SMF network element, where the response message to the request includes channel information of a secondary user-plane channel which is set up between a first UPF network element in a UPF network element group, and the secondary RAN network element, where the first UPF network element is an IP anchor device in a PDU session connection; and to send the response message to the request to the secondary RAN network element. Reference can be made to the related description in the embodiment above for details thereof, so a repeated description thereof will be omitted here.

Here in FIG. 11, the bus architecture includes any number of interconnecting buses and bridges to particularly link together various circuits including one or more processors represented by the processor 1100, and one or more memories represented by the memory 1120. The bus architecture can further link together various other circuits, e.g., a peripheral device, a manostat, a power management circuit, etc., all of which are well known in the art, so a further description thereof will be omitted in this context. The bus interface 1130 serves as an interface. The network interface 1110 can be a number of elements, e.g., a transmitter and a receiver, which are units for communication with various other devices over a transmission medium. The processor 1100 is responsible for managing the bus architecture and performing normal processes, and further provides various functions including timing, a peripheral interface, voltage regulation, power management, and other control functions. The memory 1120 stores data for use by the processor 1100 in performing the operations.

An embodiment of the invention further provides a computer readable storage medium storing computer executable instructions configured to cause the computer to perform the functions at the first UPF network element side according to the embodiment of the invention.

An embodiment of the invention further provides a computer readable storage medium storing computer executable instructions configured to cause the computer to perform the functions at the second UPF network element side according to the embodiment of the invention.

An embodiment of the invention further provides a computer readable storage medium storing computer executable instructions configured to cause the computer to perform the functions at the SMF network element side according to the embodiment of the invention.

An embodiment of the invention further provides a computer readable storage medium storing computer executable instructions configured to cause the computer to perform the functions at the primary RAN network element side according to the embodiment of the invention.

In summary, in the embodiments of the invention, a secondary user-plane channel for offloading data is set up through a UPF network element, where the secondary user-plane channel for offloading data is generally a secondary user-plane channel which is set up to the UPF network element through a secondary RAN network element according to information about the secondary RAN network element in a request message sent by a primary RAN network element; and a base station in the secondary RAN network element can be of an LTE system, and a base station in the primary RAN network element can be of a 5G system, so that the utilization ratio of radio resources can be improved, a system handover delay can be shortened, and the experience of a subscriber, and the system performance can be improved, using the technology of dual-connectivity between the LTE system and the 5G system.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A communication method, comprising:
    setting up, by a first User-Plane Function (UPF) network element, a secondary user-plane channel to a secondary Radio Access Network (RAN) network element; and
    receiving, by the first UPF network element, downlink data over a data network, and transmitting downlink data to be offloaded, to the secondary user-plane channel according to data-stream-to-be-offloaded information stored in the first UPF network element;
    wherein the first UPF network element is a unique UPF network element in a Packet Data Unit (PDU) session connection;
    before the setting up, by the first UPF network element, the secondary user-plane channel to the secondary Radio Access Network (RAN) network element, the method further comprises:
    receiving, by the first UPF network element, a first request message sent by a Session Management Function (SMF) network element for setting up a user-plane channel, wherein the first request message comprises information about a first secondary user-plane channel, and the data-stream-to-be-offloaded information, and the first secondary user-plane channel is a user-plane channel from the first UPF network element to the secondary RAN network element; and
    setting up, by the first UPF network element, the secondary user-plane channel to the secondary RAN network element comprises:
    setting up, by the first UPF network element, the secondary user-plane channel from the first UPF network element to the secondary RAN network element according to the information about the first secondary user-plane channel.

2. The communication method according to claim 1, wherein the data-stream-to-be-offloaded information comprises at least one of a stream identifier, Quality of Service (QoS) information, or Internet Protocol (IP) quintuple information.

3. A User-Plane Function (UPF) network element, comprising a processor and a memory, both of which are connected over a bus, wherein:
    the processor is configured to read and execute program in the memory to perform the method according to claim 1.

4. The UPF network element according to claim 3, wherein the processor is further configured to send a response message to the request to the SMF network element after the secondary user-plane channel to the secondary RAN network element is setup.

5. The UPF network element according to claim 3, wherein the data-stream-to-be-offloaded information comprises at least one of a stream identifier, Quality of Service (QoS) information, or Internet Protocol (IP) quintuple information.

6. A computer non-transitory readable storage medium, storing computer executable instructions configured to cause the computer to perform the method according to claim 1.

7. A communication method, comprising:
    setting up, by a first User-Plane Function (UPF) network element, a secondary user-plane channel to a secondary Radio Access Network (RAN) network element; and
    receiving, by the first UPF network element, downlink data over a data network, and transmitting downlink data to be offloaded, to the secondary user-plane channel according to data-stream-to-be-offloaded information stored in the first UPF network element;
    wherein the first UPF network element is an IP anchor device in a PDU session connection, and the PDU session connection further comprises a second UPF network element which is a user-plane anchor device in the PDU session connection; and
    the method further comprises:
    receiving, by the second UPF network element, a second request message sent by an SMF network element for setting up a user-plane channel, wherein the second request message comprises information about a second secondary user-plane channel, and the data-stream-to-be-offloaded information, and the second secondary user-plane channel is a user-plane channel from the first UPF network element to the second UPF network element; and setting up, by the second UPF network element, the secondary user-plane channel from the first UPF network element to the second UPF network element according to the information about the second secondary user-plane channel;

wherein after the setting up, by the first UPF network element, the secondary user-plane channel to the secondary RAN network element, the method further comprises:

sending, by the first UPF network element, a response message to the request to the SMF network element.

* * * * *